United States Patent [19]

Nakajou et al.

[11] Patent Number: 5,783,998
[45] Date of Patent: Jul. 21, 1998

[54] BATTERY PACK, METHOD AND ELECTRONIC DEVICE FOR CONTROLLING ITS OPERATION DEVICE

[75] Inventors: Hideki Nakajou, Tokyo; Takeshi Miura; Minoru Doura, both of Kanagawa, all of Japan

[73] Assignee: Sony Corporation, Tokyo, Japan

[21] Appl. No.: 643,092

[22] Filed: May 2, 1996

[30] Foreign Application Priority Data

May 12, 1995 [JP] Japan .................................. 7-113484

[51] Int. Cl.⁶ .................................................. G08B 21/00
[52] U.S. Cl. ........................ 340/636; 340/635; 324/426; 324/433; 320/27; 320/43; 320/48
[58] Field of Search ............................. 340/635, 636, 340/660, 661, 664; 324/426, 427, 433; 320/13, 14, 26, 27, 28, 43, 48

[56] References Cited

U.S. PATENT DOCUMENTS

| | | | |
|---|---|---|---|
| 4,965,738 | 10/1990 | Bauer et al. | 364/483 |
| 5,406,188 | 4/1995 | Myslinski et al. | 320/14 |
| 5,534,765 | 7/1996 | Kreisinger et al. | 320/30 |
| 5,534,788 | 7/1996 | Smith et al. | 324/771 |
| 5,572,110 | 11/1996 | Dunstan | 320/30 |

*Primary Examiner*—Jeffery A. Hofsass
*Assistant Examiner*—Ashok Mannava
*Attorney, Agent, or Firm*—Limbach & Limbach L.L.P.

[57] ABSTRACT

A battery pack including a secondary battery is coupled to an electronic device to behave as a power source of the electronic device. The battery pack comprises a plus terminal (EB+) and a minus terminal (EB−) for supplying a current to the electronic device, a communication terminal (DATAB) for exchanging data with the electronic device, a connection terminal (BATTINB) connected to said electronic device when the plus terminal and the minus terminal are properly connected to the electronic device, battery status measuring elements (6, 7) for measuring the temperature and the voltage of the secondary battery, and CPU (1) for establishing one of operation modes in response to the voltages at the communication terminal and the connection terminal.

5 Claims, 3 Drawing Sheets

BATTERY PACK, METHOD AND ELECTRONIC DEVICE FOR CONTROLLING ITS OPERATION DEVICE

BACKGROUND OF THE INVENTION

1. Field of the Invention

This invention relates to a battery pack capable of exchanging data on the state of a secondary battery, for example, and a method and an electronic device for controlling operation modes of the battery pack.

2. Related Art

Battery packs called smart batteries or intelligent batteries have recently been realized, which contain a battery monitoring integrated circuit (IC) or a temperature sensor, for example, to monitor the status of the battery (for example, voltage, charge-discharge current, temperature, and so on, of the secondary battery) and to exchange data with the load of a battery charger or a computer.

The use of the battery pack enables relatively accurate calculation of the available capacity or other job on the part of the battery charger or load.

Also available are battery packs having a field effect transistor (FET) to protect the secondary battery from overcharge. FIG. 3 shows one of battery packs of this type. Used as the secondary battery E is a lithium-ion battery, for example, in which the plus terminal is coupled to the terminal EB+ of the battery pack and the minus terminal is coupled to the terminal EB− of the battery pack via FET4 and FET3 connected in series with the secondary battery E.

The central processor unit (CPU) 1 controls the voltage to be applied to gates G of FET3 and FET4 (N channel MOSFETs) to turn them ON or OFF. The source terminal of CPU 1 (the terminal for introducing power into CPU 1) is coupled to the junction between the plus terminal of the secondary battery E and the terminal EB+ via a constant voltage circuit 8, and the ground terminal GND is coupled to the minus terminal of the secondary battery E.

When the voltage of the source terminal and the ground terminal GND of CPU 1 surpasses a predetermined value (a voltage suitable as the source of CPU 1), the constant voltage circuit 8 lowers the voltage.

The drain D of FET3 is coupled to the terminal EB−, and the source S is coupled to the source of FET4. The drain of FET4 is coupled to the junction between the ground terminal GND of CPU 1 and the minus terminal of the second battery E.

FET3 contains a parasitic diode 3A formed between the source and the drain and oriented in the flowing direction where the current to charge the secondary battery E flows (that is, in the direction where the current discharged from the secondary battery E does not flow). FET4 contains a parasitic diode 4A formed between the source and the drain and oriented in the flowing direction where the current discharged from the secondary battery E flows (that is, in the direction where the current to charge the secondary battery E does not flow).

The battery pack having the above arrangement may be coupled to a load/charger 15 having terminals EC+, EC− and a data terminal DATAC. When the battery pack is coupled to the load/charger 15, terminals EB+, EB− and data terminal DATAB are connected to terminals EC+, EC− and data terminal DATAC.

In the normal state of the battery pack (where the voltage of the secondary battery E is in a predetermined range), CPU 1 applies a H level to the gates of FET3 and FET4, and keeps them ON.

Therefore, when the load/charger 15 is connected between the terminals EB+ and EB− to function as a load, a discharge current flows through the path of the secondary battery E, terminals EB+, EB−, load/charger 15, terminals EC−, EB−, FET3 (drain and source of FET3) and FET4 (source and drain of FET4).

In this condition, CPU 1 detects the battery voltage. The battery voltage sometimes decreases below the first reference voltage due to a decrease in capacity of the secondary battery E or a short-circuit across the terminals EB+ and EB−. In this occasion, CPU 1 applies a L level to the gate of FET3 and turns FET3 OFF. Since the parasitic diode 3A of FET3 is oriented in the direction where the discharged current does not flow, by turning FET3 OFF, the discharge current is interrupted, and overdischarge can be prevented. Therefore, FET3 may be regarded an overdischarge preventive FET.

When the load/charger 15 is connected between the terminals EC+ and EB− to function as a battery charger, the charge current flows through the path of the load/charger 15, terminals EC+30 , EB+, secondary battery E, FET4, FET3 and terminals EB−, EC−.

Also when the charging is effected, CPU 1 detects the battery voltage. The battery voltage sometimes increases above a second reference voltage (a value which may overcharge the secondary battery E) when the charging is completed, for example. In such cases, CPU 1 applies the L level to the gate of FET4 and turns FET4 OFF. Since the diode 4A of FET4 is oriented in the direction where the charge current does not flow, by turning FET4 OFF, the charge current is interrupted, and overcharge can be prevented. Therefore, FET4 may be regarded an overcharge preventive FET.

In the state where the battery pack is coupled to the load/charger 15, a control signal demanding a state of the secondary battery E is supplied from the load/charger 15 through the data terminals DATAC and DATAB. In receipt of the control signal, CPU 1 sends the state of the secondary battery E (for example, its temperature, battery voltage, and so on) to the load/charger 15 through the data terminals DATAC and DATAB. Thus, the load/charger 15 can know the state of the secondary voltage E.

When the battery voltage is above a predetermined value, CPU 1 uses it as its power source. When the battery voltage is below a predetermined voltage, with the load/charger 15 being connected to the battery pack to behave as a battery charger, CPU 1 uses as its power source the voltage supplied from the load/charger 15.

A problem with the battery pack with the above arrangement is that, when it is coupled to a load of a computer, for example, respective blocks of the battery pack perform their normal operations regardless of any state of the power source of the computer.

That is, even after the power source of the computer is turned OFF, the battery monitoring IC, temperature sensor, etc. in the battery pack still operate consuming useless power. This results in reducing the time for the computer to operate with the battery pack alone without relying on an alternating current (AC) adapter, for example, (the duration of the battery pack).

In the example of FIG. 3 showing a battery having FETs for protecting the secondary battery from overcharge, FET3 and FET4 are located near the terminal EB−, and the ground terminal GND of CPU 1 is connected to the junction between the minus terminal of the secondary battery E and the drain of FET4. In another example, FET3 and FET4 are located in opposite positions from those of FIG. 3, and the ground terminal GND of CPU 1 is connected to the junction between the minus terminal of the secondary battery E and the source of FET3. Therefore, when FET4 is turned OFF upon completion of the charging, for example, the potential of the ground terminal GND of CPU 1 may differ from the ground potential of the load/charger 15 (normally, the potential of the terminal EC−), and may disturb normal operation of CPU 1.

Since the parasitic diode 4A is formed to cause a current flows from the source toward the drain of FET4 (in the direction where the discharge current flows) when the voltage applied from the load/charger 15 (the charge voltage) is higher than the battery voltage under the Off state of FET4, a voltage drop of about 0.6 V to 0.8 V occurs due to the parasitic diode 4A. So much, the potential of the ground terminal GND of CPU 1 becomes higher than the ground of the load/charger 15. Therefore, it may occur that communication between CPU 1 and the load/charger 15 through the data terminals DATAB and DATAC is impossible.

When CPU 1 becomes inoperative due to a decrease in battery voltage below a predetermined voltage under while FET4 remains OFF, no current flows from the drain toward the source of FET4 even by connecting the load/charger 15 to the battery pack to function as a battery charger. It occurs, therefore, that CPU 1 is not supplied with power and cannot turn FET4 ON, which is very likely to make the battery pack unusable.

SUMMARY OF THE INVENTION

It is therefore a primary object of the invention to provide a battery pack having an elongated duration.

A secondary object of the invention is to prevent a battery pack from becoming inoperative under various conditions referred to above.

According to a primary aspect of the invention, there is provided a battery pack comprising a plus terminal and a minus terminal for supplying a current to the electronic device; a communication terminal for exchanging data with the electronic device; a connection terminal which is connected to the electronic device when the plus terminal and the minus terminal are properly connected to the electronic device; battery status measuring elements (6, 7) for measuring the temperature and the voltage of the secondary battery; and mode determining means (1) for establishing one of operation modes in response to the voltages at the communication terminal and the connection terminal.

A method for controlling operation modes of a battery pack according to the primary aspect of the invention is concerned in a battery pack which comprises a plus terminal and a minus terminal for supplying a current to an electronic device, a communication terminal for executing communication with the electronic device, and a connection terminal connected to the electronic device when the plus terminal and the minus terminal are properly connected to the electronic device, so as to be coupled to the electronic device and operative as a power source of the electronic device, and the method comprises the steps of: detecting voltages at the communication terminal and the connection terminal; and establishing one of operation modes in response to a result of the detection.

An electronic device according to the primary aspect of the invention comprises a plus terminal and a minus terminal for introducing a current from a battery pack, a communication terminal for exchanging data with the battery pack, a connection terminal connected to the battery pack when the plus terminal and the minus terminal are properly connected to the battery pack; and detector means for detecting the status of a power source and for adjusting an output voltage of the communication terminal to a predetermined value, such that a voltage of a predetermined level is output from the connection terminal.

According to a secondary aspect of the invention, there is provided a battery pack further comprises switching means connected in series to the secondary battery to supply or interrupt a charge current to the secondary battery, and control means for controlling the switching means, in which the switching means includes an overcharge preventive field effect transistor including a parasitic diode oriented not to permit the charge current to flow, and the overcharge preventive field effect transistor has a drain connected to a minus terminal of the secondary battery and a source connected to a ground terminal of the control means.

DETAILED DESCRIPTION OF THE PREFERRED EMBODIMENTS

Figure 1:
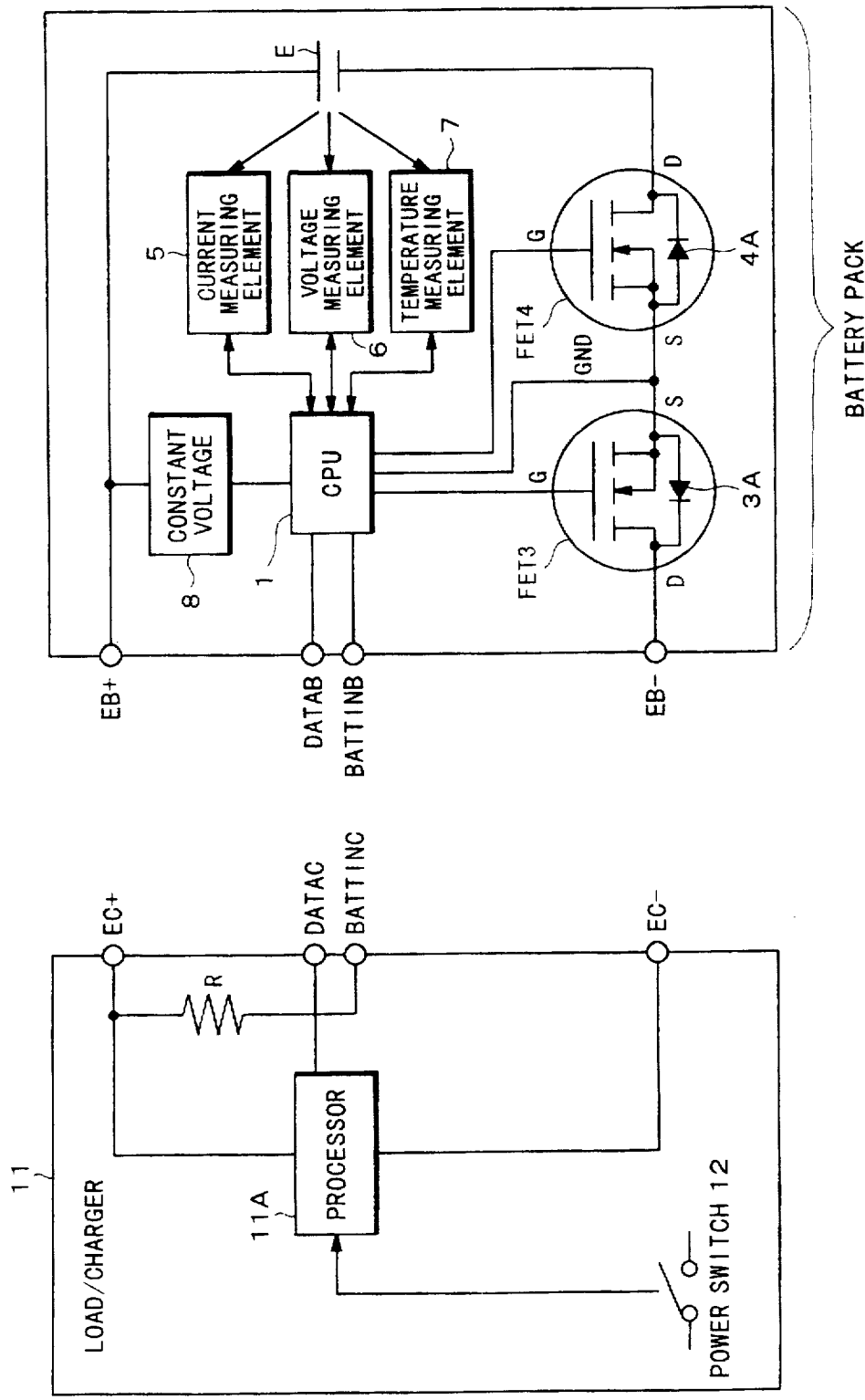
FIG. 1 is a diagram showing a combination of a battery pack and a load/charger 11 used as an electronic device, taken as an embodiment of the invention.

FIG. 1 shows the arrangement of a battery pack embodying the invention and a load/charger (electronic device) 11 which is either a load of a portable computer, for example, using the battery pack as its power source, or a battery charger for charging the battery pack.

Figure 3:
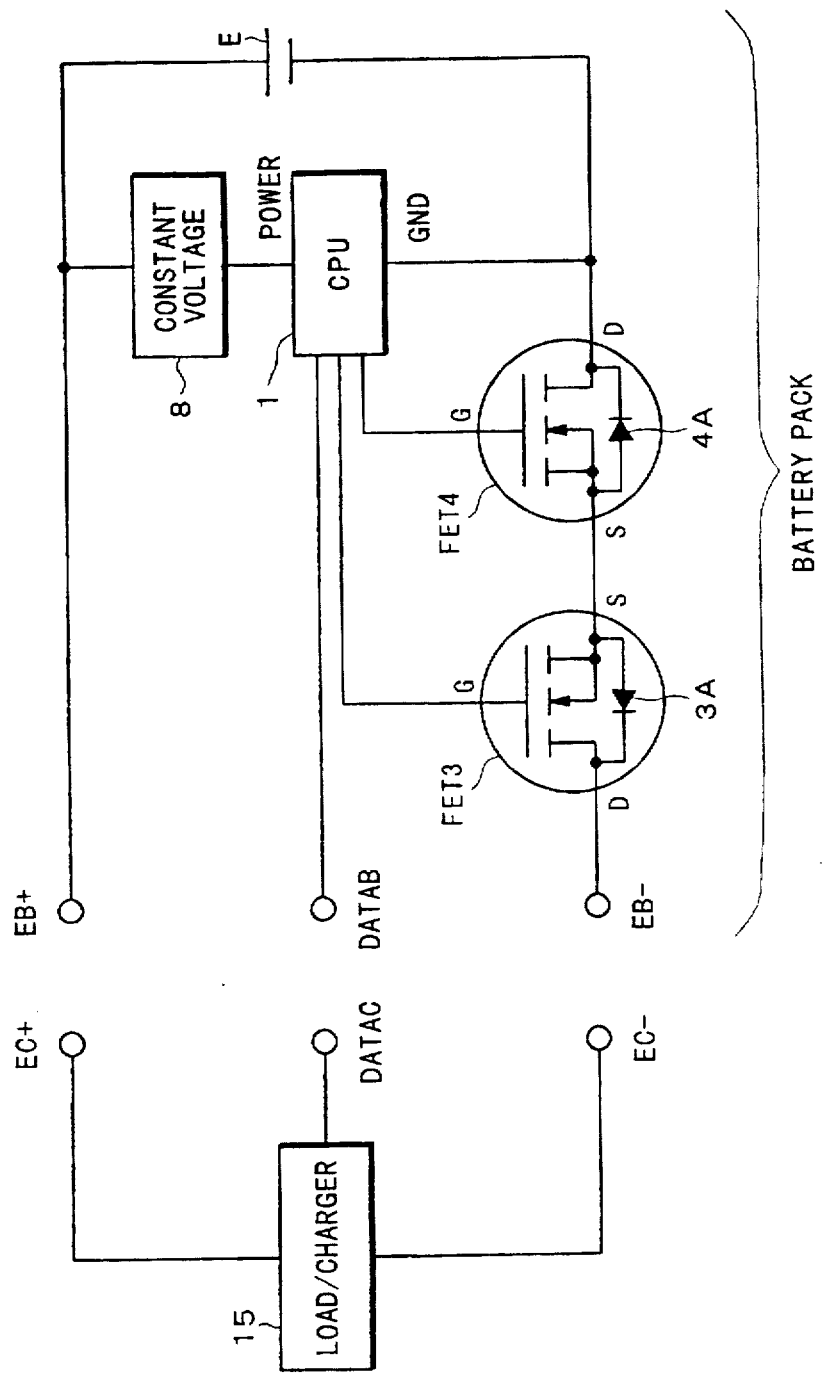
FIG. 3 is a diagram showing a conventional combination of a battery pack and overcharge preventive FETs.

In FIG. 1, the same or equivalent elements as those of FIG. 3 are labelled with the same reference numerals. In the battery pack shown in FIG. 1, the source of FET4 is connected to the ground terminal GND of CPU 1 instead of the source of FET3, and the drain of FET4 is connected to the minus terminal of the secondary battery E instead of the ground terminal GND of CPU 1.

The battery pack includes another terminal BATTINB (connecting terminal) in addition to those shown in FIG. 3.

In response to data supplied through the data terminal DATAB, CPU 1 executes predetermined processing or delivers information on the current status of the secondary battery E, including charge or discharge current from a current measuring element 5, the voltage from a voltage measuring element 6, temperature from a temperature measuring element 7, or the like, through the data terminal DATAB.

CPU 1 is connected also to the connection terminal BATTINB of the battery pack, which is connected to a connection terminal BATTINC of the load/charger 11 when the terminal EB+ and EB− of the battery pack are properly connected to the load/charger 11, so that CPU 1 established an appropriate mode of the battery pack depending on the voltages at the connection terminal BATTINB and the data terminal DATAB.

The current measuring element 5 detects the current discharged from the secondary battery E or the current to charge the secondary battery E, and supplies it to CPU 1. The voltage measuring element 6 detects the battery voltage and supplies it to CPU 1. The temperature measuring element 7 detects the temperature of the secondary battery E and supplies it to CPU 1.

Power is supplied to the current measuring element 5, voltage measuring element 6 and temperature measuring element 7 in the same manner as supplied to CPU 1. CPU 1 can control the supply of the power to the current measuring element 5, voltage measuring element 6 and temperature measuring element 7.

The load/charger 11 generally comprises a processor 11A (detector means) behaving as a load or a battery charger, and a power switch 12. The load/charger 11 has a terminal BATTINC (connection terminal) in addition to the terminals common to the load/charger 15 of FIG. 3.

The processor 11A is coupled to the terminal EC+ and EC−. Therefore, when the load/charger 11 behaves as a load, the discharge current from the secondary battery E flows through the terminals EC+ and EC−, and the processor 11A uses the current as its power source. When the load/charger 11 behaves as a battery charger, the processor 11A supplies the charge current to the secondary battery E through the terminal EC+ and EC−.

The power switch 12 is operated to connect or cut the power supply to the load/charger 11. The processor 11A detects the current state of the power source by monitoring the state of the power switch 12, for example, and responsively changes the output voltage from the data terminal DATAC into a value (for example, 5 V as the H level or 0 V as the L level).

The connection terminal BATTINC is supplied with a predetermined voltage. In this embodiment, the connection terminal BATTINC is connected to the terminal EC+ via a resistor R. As a result, when the battery pack is properly coupled to the load/charger 11, the voltage of the terminal EB+ of the battery pack appears at the connection BATTINC via the terminal EC+ and the resistor R.

Next explained are behaviors of the system described above. When the predetermined voltage is not applied to the terminal BATTINB, CPU 1 applies the L level to the gates of FET3 and FET4. Thus, FET3 and FET4 are held OFF. Under the condition, when the battery pack is properly coupled to the load/charger 11, the voltage at the terminal EB+ (battery voltage) is output from the connection terminal BATTINB through the terminal EC+30, resistor R and connection terminal BATTINC.

This voltage is detected by CPU 1. When detecting the predetermined voltage from the connection terminal BATTINB, CPU 1 applies the H level to the gates of FET3 and FET4. Thus, FET3 and FET4 become ON. Therefore, if the load/charger 11 operates as a load and the battery pack is properly coupled, then a discharge current flows along the path of the secondary battery E, terminals EB+, EC+, processor 11A, terminals EC−, EB−, FET3 and FET4.

At this time, CPU 1 monitors the battery voltage supplied from the voltage measuring element 6. When the battery voltage decreases below a first reference voltage (a value possibly causing an overdischarge of the secondary battery E), CPU 1 supplies the L level to the gate of FET3. Thus, FET3 is changed OFF, and overdischarge is prevented.

Under the condition, if the load/charger 11 is set to operate a battery charger, a charge current flows along the path of the processor 11A, terminals EC+, EB+, secondary battery E, FET4, parasitic diode 3A, terminals EB− and EC−, and begins to charge the secondary battery E. If a certain level of voltage is applied to the gate of FET3 (FET 4 as well), then the ON resistance becomes small, and the voltage drop at the source and the drain is small. In the parasitic diode 3A, however, since a voltage drop as large as 0.6 V to 0.8 V occurs. Therefore, efficient discharging is not possible.

To cope with the problem, CPU 1 is configured to detect a voltage drop (a voltage around 0.4 V) caused by the discharge, for example, when the discharge starts. Upon detecting the voltage drop, CPU 1 forcibly applies the H level to the gate of FET4 and changes it ON. As a result, a discharge current efficiently flows along the path of the secondary battery E, terminals EB+, EC+, load/charger 11, terminals EC−, EB−, FET3 and FET4.

Here again, like the case of FET3, application of the H level to FET4 can be prohibited when the predetermined voltage is not applied to the connection terminal DATAB.

When the load/charger 15 behaves as a battery charger, if FET4 is cut, then a voltage drop occurs in the direction from the source to the drain of FET4 due to the parasitic diode 4A. However, since the drain of FET4 is connected to the minus terminal of the secondary battery E and the source to the ground terminal GND of CPU 1, the potential of the ground terminal GND of CPU 1 is not affected by the voltage drop due to the parasitic diode 4A.

The potential of the ground terminal GND of CPU 1 becomes equal to the ground of the load/charger 11 (the potential of the terminal EC−). A voltage drop occurring between the source and the gate of FET3 in the ON state is negligibly small.

As a result, it is prevented that communication between CPU 1 and the load/charger 11 via data terminals DATAB and DATAC is disabled. That is, CPU 1 can exchange data with the load/charger 11 either during discharge or during charge.

When the battery voltage decreases below a predetermined value for some reason while FET4 remains OFF, CPU 1 cannot use the secondary battery E as its power source. In this case, by connecting the load/charger 11 to the battery pack to behave as a battery charger, a current flows to CPU 1 along the path of the load/charger 11, terminals EC+, EB+, constant voltage supplier 8, CPU 1, FET3 (or parasitic diode 3A), terminals EB− and EC−, and CPU 1 can operate with the load/charger 11 as the power source. Therefore, it is prevented that the battery pack becomes unusable.

By using the load/charger 11 as the power source, CPU 1 can change FET4 ON and can charge the secondary battery E.

If the battery voltage decreases below the predetermined value, then CPU 1 cannot supply the gate of FET3 with a voltage enough to maintain FET3 ON. As result, FET3 turns OFF; however, since the parasitic diode 3A of FET3 is made in the flowing direction of the charge current, the current from the load/charger 11 is not interrupted by FET3.

Application of the H level to the gate of FET3 is limited to the situation where the predetermined voltage is applied to CPU 1 via the connection terminal DATAB. More specifically, when the battery pack is not properly coupled to the load/charger 11, which pertains to non-connection between the terminals BATTINC and BATTINB, CPU 1 does not apply the H level to the gate of FET3. Therefore, the batty pack is operative only for charge and not for discharge.

If the battery pack is not properly coupled to the load/charger 11, the connection terminal BATTINB of the battery pack is not connected to the connection terminal BATTINC of the load/charger 11. In this case, the predetermined voltage does not appear at the connection terminal BATTINB, and CPU 1 does not detect the predetermined voltage through the connection terminal BATTINB.

When CPU 1 cannot detect the predetermined voltage through the connection terminal BATTINB, it does not apply the H level to the gate of FET3. Therefore, the L level is kept at the gate of FET3. Since the parasitic diode 3A is formed in the direction where the discharge current does not flow, no discharge current flows even if the terminal EB+ or EB− of the battery pack is connected to the terminal EC− or EB+ of the load/charger 11.

Therefore, even if a reverse voltage is applied to the processor 11A in the opposite direction from the normal voltage, the processor 11A is protected from damage caused by the reverse voltage.

In order to prevent that a reverse voltage opposite from the normal voltage is applied, the battery pack, as well as a part of the load/charger 11 for accommodating the battery pack, are preferably configured to disable the connection which may cause a reverse voltage to be applied.

When the terminals EB+ and EB− of the battery pack are connected directly, for example, since CPU 1 does not detect the predetermined voltage through the connection terminal BATTINB like in the foregoing description, FET3 is kept OFF. Here again, no discharge current flows, and the battery pack is protected from damage caused by a short circuit between the terminals EB+ and EB−.

If the terminals EB+ and EB− are short-circuited, regardless of any voltage appearing at the connection terminal BATTINB, a large discharge current flows also when CPU 1 executes ON/OFF control of FET3 and FET4. As a result, the battery voltage decreases. FET3 is changed OFF as explained above, and the discharge current is interrupted. This is another aspect of protecting the battery pack from damage. In this case, a large discharge current flows for a short time. In contrast, the battery pack of FIG. 1 does not cause such a large discharge current, and can more effectively protect the battery pack from damage.

Figure 2:
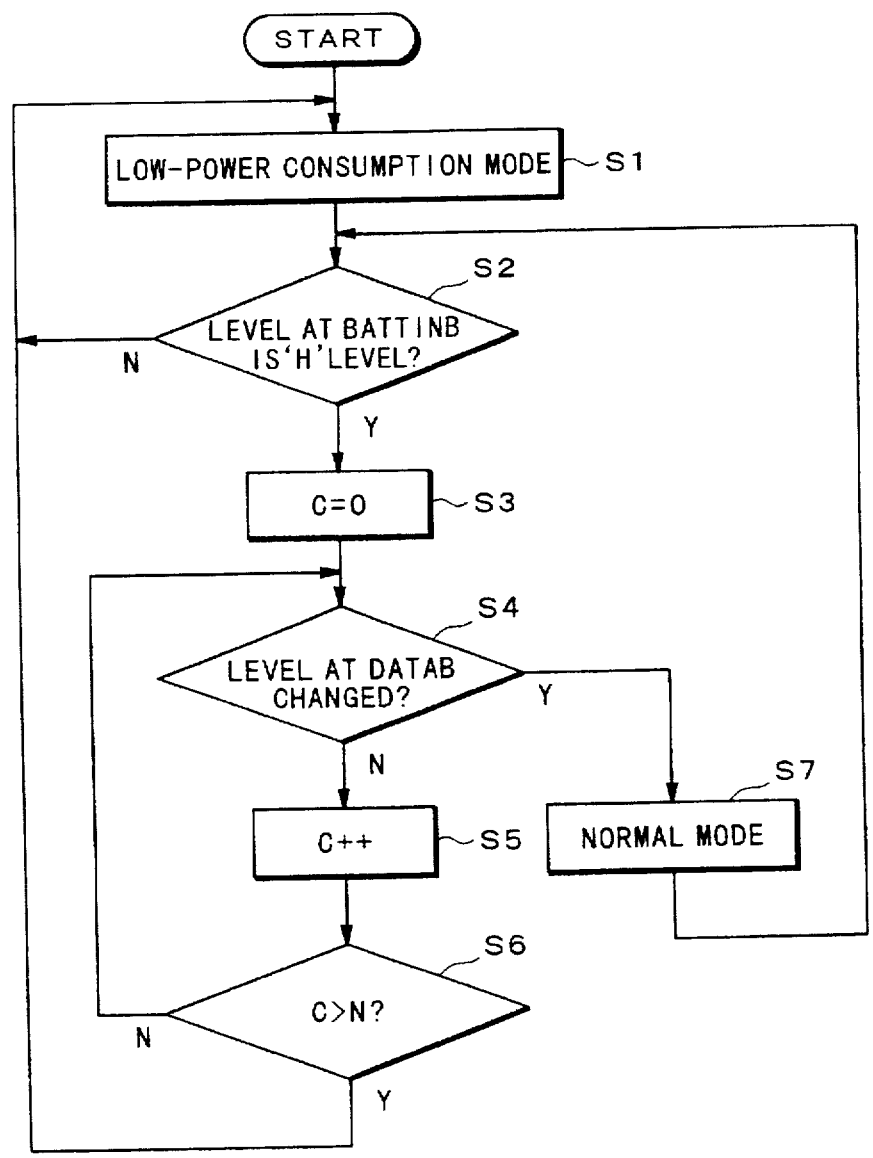
FIG. 2 is a flow chart depicting operations of CPU 1 shown in FIG. 1.

CPU 1 is designed to establish an appropriate operation mode of the battery pack in response to the voltages at the connection terminal BATTINB and the data terminal DATAB. A process for establishing an operation mode by CPU 1 is explained below with reference to the flow chart of FIG. 2.

The process start with step S1 where CPU 1 selects an operation mode minimizing the consumption. In step S1, some of the blocks of the battery pack, having an additional function, are held inoperative (at rest). In this example, CPU 1 stops the supply of the power to the current measuring element 5, voltage measuring element and temperature measuring element 7, for example.

In step S2, it is queried whether the voltage at the connection terminal BATTINB is the H level or not. If the result of step S2 reveals that the voltage at the connection terminal BATTINB is not the H level, the process returns to step S1. This corresponds to the aspect where CPU 1 cannot detect the predetermined voltage through the connection terminal BATTINB. When the low-power consumption mode is already established in step S1, no processing is executed. That is, step S1 performs the processing for changing the operation mode to the low-consumption mode only when the battery pack is in another mode (normal mode explained later) other than the low-power consumption mode.

Therefore, when the battery pack is not coupled or not properly coupled to the load/charger 11, the battery pack is set in the low-power consumption mode to prevent useless power consumption.

If step S2 results in determining that the voltage at the connection terminal BATTINB is the H level, which means that the battery pack is properly coupled to the load/charger 11 and CPU 1 can detect the predetermined voltage at the connection terminal BATTINB, the process goes to S3. In step S3, an initial value, e.g. 0, is set to the variant C for counting the time.

In the next step S4, it is queried whether the level of the voltage at the data terminal DATAB has changed or not. The power source of the load/charger 11 is turned ON by transmission of certain data or command from the processor 11A to CPU 1 via the data terminals DATAC and DATAB, it is determined that the level of the voltage at the data terminal DATAB has been changed. Then, the process goes to step S7 to change the operation mode to the normal mode.

In step S7, the blocks of the battery pack held at rest are changed operative. In this embodiment, CPU 1 begins to supply power to the current measuring element 5, voltage measuring element 6 and temperature measuring element 7. In step S7, like in step S1, no processing is done when the battery pack is already set in the normal mode. Step S7 functions to change (or set) the operation mode to the normal mode only when the battery pack is in the low-power consumption mode.

Therefore, if CPU 1 receives a transmission request from the processor 11A, which request information on the current status of the secondary battery E, for example, the battery pack is changed to the normal mode. In response to the transmission request, the current measuring element 5, voltage measuring element 6 and temperature measuring element 7 start their operations. The states of the secondary battery E sent from the current measuring element 5, voltage measuring element 6 and temperature measuring element 7 are transmitted to the load/charger 11.

When step S4 results in finding that the level of the voltage at the data terminal DATAB has not been changed, the process goes to step S5, and the variant C is incremented by 1. In the next step S6, it is queried whether the variant C is larger than a predetermined number N or not. If the time corresponding to the number N does not expire, with no change in level of the voltage at the data terminal DATAB, after the voltage at the connection terminal BATTINB is determined to be the H level in step S2, step 6 determines that the variant C is not larger than the number N, and the process returns to step S4.

When the time corresponding to the number N has passed, with no change in level of the voltage at the data terminal DATAB, after the voltage at the connection terminal BATTINB was determined to be the H level in step S2, step S6 determined that the variant C is larger than the number C, and the process returns to step S1. As a result, if the battery pack is in the normal mode, it is changed to the low-consumption mode in step S1.

The processor 11A detects the current state of the power source by monitoring the current state of the power switch 12 as described above. If the power source is OFF, then the level of the voltage at the data terminal DATAC is set at a predetermined value (for example, the H level). Therefore, as long as the power source of the load/charger 11 is OFF, the level of the voltage at the data terminal DATAC remains unchanged at the H level, and the battery pack is held in the low-power consumption mode even when properly coupled to the load/charger 11.

As a result, useless power consumption by the battery pack is prevented.

Even when the power of the load/charger 11 is ON, the level of the voltage at the data terminal DATAC does not change unless the processor 11A issues a transmission request to CPU 1 to request information on the current state of the secondary battery E, for example. Therefore, even if the power source of the load/charger 11 is ON, the battery pack is set to the low-power consumption mode when there is no communication between CPU 1 and the processor 11A for a given time (the time corresponding to the number N).

The battery pack is put in the normal mode when the level of the voltage at the data terminal DATAB changes while the voltage at the connection terminal BATTINB is in the predetermined level (H level in the embodiment), and it is put in the low-power consumption mode when no change occurs in level of the voltage at the data terminal DATAB for a certain time while the voltage at the connection terminal BATTINB is held in the predetermined level and when the voltage at the BATTINB is a level other than the predetermined level. Therefore, in various cases where the current measuring element 5, voltage measuring element 6 and temperature measuring element 7 need not be operative, such as physical disconnection between the battery pack and the load/charger 11, the Off-state of the load/charger 11, or no communication between CPU 1 and the processor 11A, and useless power consumption is prevented. As a result, the duration of the battery pack can be elongated.

Although the invention has been shown and described with respect to a preferred embodiment thereof, the foregoing and other changes and omissions in the form and detail thereof may be made therein. Namely, the lithium ion battery used in the embodiment as the secondary battery E may be replaced by one of another type (for example, lead battery or NiCd battery).

The connection between the terminals EC+ and BATTINC of the load/charger 11 via the resistor R to have a predetermined voltage appear at the terminal BATTINC may be modified to output the predetermined voltage from the processor 11A to the terminal BATTINC.

Instead of configuring FET3 and FET4 under direct control by CPU 1, FET3 and FET4 may be otherwise controlled, for example, by the processor 11A through the data terminals DATAC, DATAB and CPU 1.

Moreover, the embodiment may be modified such that one of H and L levels, e.g. the H level, is output from the data terminal DATAC to the processor 11A when there is no communication between CPU 1 and the processor 11A whereas the L level is output when the power source is OFF. In this case, when the voltage at the data terminal DATAB does not change for a given time, CPU 1 can know the current state of the power source of the load/charger 11 by referring to whether the level of the voltage is the H level or the L level.

In case of a battery pack directed to prevention of useless power consumption, FETs used as elements for permitting or interrupting the discharge or charge current may be replaced by any other elements behaving as switches.

Regarding the invention as to the part of FETs for protecting the secondary battery from overcharge, it is applicable to any types of battery packs using FETs for protecting the secondary battery from overcharge but not having the function to inform the load/charger 11 of the current state of the secondary battery E, which has been explained with reference to the embodiment (smart battery or intelligent battery).

According to the battery pack and the method for controlling its operation mode according to the first-aspect of the invention, since an appropriate mode is selected in response to a result of detection of the voltage at the connection terminal of the battery pack for connection of an electronic device when the communication terminal for exchanging data with the electronic device and the plus and minus terminals for supplying a current to the electronic device are properly connected to the electronic device, useless power consumption can be prevented.

In case of the electronic device according to the first aspect of the invention, the current status of the power source is detected, and the output voltage from the communication terminal for exchanging data with the battery pack is adjusted to a constant value in response to the result of the detection. The connection terminal configured to output a predetermined level is connected to the battery pack when the plus and minus terminals are properly connected to the battery pack. Therefore, the state of connection to the electronic device and the state of its power source can be known on the part of the battery pack by reference to the voltages at the communication terminal and the connection terminal.

In case of the battery pack according to the second aspect of the invention, the drain of the field effect transistor having a parasitic diode oriented not to permit the charge current to flow so as to prevent overcharge is connected to the minus terminal of the secondary battery, and the source is connected to the ground terminal of control means. Therefore, by ON/OFF control of the overcharge-preventive field effect transistor, the potential of the ground terminal of the control means is held unchanged, and it is prevented that the battery pack fails to operate properly.

What is claimed is:

1. A battery pack coupled to an electronic device and including a secondary battery behaving as a power source of the electronic device, comprising:

a plus terminal and a minus terminal for supplying a current to said electronic device;

a communication terminal for executing communication with said electronic device;

a connection terminal connected to said electronic device when said plus terminal and said minus terminal are properly connected to said electronic device;

battery status measuring means for measuring the temperature and the voltage of said secondary battery; and mode determining means for establishing one of operation modes in response to the voltages at said communication terminal and said connection terminal; wherein said modes include:

a normal mode selected when the voltage at said connection terminal exhibits a predetermined level and the voltage at said communication terminal changes, so that the entirety of said battery pack including said battery status measuring means is made operative; and a low-power consumption mode selected when the voltage at said connection terminal exhibits said predetermined level and the voltage at said communication terminal does not change for a predetermined time, or when the voltage at said connection terminal exhibits a level other than said predetermined level, so that an additional functional portion of said battery including said battery status measuring means is made inoperative.

2. The battery pack according to claim 1, further comprising switching means connected in series to said secondary battery to supply or interrupt a charge current to said secondary battery, said switching means including an overcharge preventive field effect transistor including a parasitic diode oriented not to permit the charge current to flow, said overcharge preventive field effect transistor having a drain connected to a minus terminal of said secondary battery and a source connected to a ground terminal of said control means, and said mode determining means controlling said switching means.

3. The battery pack according to claim 2, wherein said switching means includes an overdischarge preventive field effect transistor having a parasitic diode oriented not to permit a discharge current from said secondary battery to flow so as to control the discharge current to flow or not to flow, said overdischarge preventive field effect transistor having a source connected to the source of said overcharge preventive field effect transistor.

4. An electronic device operative in receipt of a current from a battery pack adaptive for communication therewith, comprising:

a plus terminal and a minus terminal for introducing a current from said battery pack;

a communication terminal for executing communication with said battery pack;

a connection terminal connected to said battery pack when said plus terminal and said minus terminal are properly connected to said battery pack; and detector means for detecting the status of a power source and for adjusting an output voltage of said communication terminal to a predetermined value, such that a voltage of a predetermined level is output from said connection terminal.

5. The electronic device according to claim 4, wherein said connection terminal is connected to said plus terminal.

* * * * *